US012697664B2

(12) United States Patent　　　　(10) Patent No.:　US 12,697,664 B2
Toyoshima　　　　　　　　　　　　　(45) Date of Patent:　　　Aug. 4, 2026

(54) ANALYSIS DEVICE, ANALYSIS METHOD, MACHINING SYSTEM, AND PROGRAM

(71) Applicant: Sumitomo Electric Industries, Ltd., Osaka (JP)

(72) Inventor: Akihiro Toyoshima, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 95 days.

(21) Appl. No.: 18/701,622

(22) PCT Filed: Oct. 18, 2021

(86) PCT No.: PCT/JP2021/038357
§ 371 (c)(1),
(2) Date: Apr. 16, 2024

(87) PCT Pub. No.: WO2023/067643
PCT Pub. Date: Apr. 27, 2023

(65) Prior Publication Data
US 2025/0229341 A1　　Jul. 17, 2025

(51) Int. Cl.
B23B 49/00　　　(2006.01)
G06T 11/26　　　(2026.01)

(52) U.S. Cl.
CPC .............. B23B 49/00 (2013.01); G06T 11/26 (2026.01)

(58) Field of Classification Search
CPC ....... B23B 49/00; G06T 11/206; G06T 11/26; G05B 2219/37027; G05B 2219/37256; G05B 19/4065; G05B 2219/35312; G05B 2219/37085; G05B 2219/37258; G05B 2219/41376; G05B 2219/50308; G05B 2219/50313; G05B 19/406
See application file for complete search history.

(56) References Cited

U.S. PATENT DOCUMENTS

2003/0056147 A1* 3/2003 Yutkowitz .............. G05B 11/28
　　　　　　　　　　　　　　　　　714/25
2004/0176926 A1* 9/2004 Edie ................... B23Q 17/0971
　　　　　　　　　　　　　　　　　702/179

(Continued)

FOREIGN PATENT DOCUMENTS

EP　　　　3483679 A1　　5/2019
JP　　　　H10-15782 A　　1/1998

(Continued)

*Primary Examiner* — Jeffery A Brier
(74) *Attorney, Agent, or Firm* — XSENSUS LLP

(57) ABSTRACT

An analysis device according to the present disclosure analyzes the state of a machining tool. The analysis device includes: an acquisition unit that acquires a measurement result from at least one sensor fitted to the machining tool; a computation unit that performs data processing to the measurement result acquired by the acquisition unit; and an image processing unit that displays a first image and a second image on a display screen, the first image displaying the measurement result acquired by the acquisition unit in time-series, the second image displaying a computation result after the data processing is performed by the computation unit. The image processing unit displays, as the second image, the computation result corresponding to the measurement result for a specific time period in the first image.

18 Claims, 9 Drawing Sheets

(56) References Cited

U.S. PATENT DOCUMENTS

| | | |
|---|---|---|
| 2018/0117725 A1 | 5/2018 | Laurent et al. |
| 2020/0070295 A1* | 3/2020 | Uenishi .................. B23Q 17/12 |
| 2020/0125072 A1* | 4/2020 | Yamamoto ......... G05B 19/4063 |
| 2020/0201527 A1 | 6/2020 | Nakajima et al. |
| 2022/0203493 A1 | 6/2022 | Yamamoto et al. |
| 2022/0281019 A1 | 9/2022 | Koike et al. |

FOREIGN PATENT DOCUMENTS

| | | |
|---|---|---|
| JP | 2005-125480 A | 5/2005 |
| JP | 2012-093983 A | 5/2012 |
| JP | 2017-132000 A | 8/2017 |
| JP | 2018-534680 A | 11/2018 |
| JP | 6724544 B2 | 7/2020 |
| JP | 2020-166543 A | 10/2020 |
| WO | 2008/146736 A1 | 12/2008 |
| WO | 2017/063868 A1 | 4/2017 |
| WO | 2018/235170 A1 | 12/2018 |
| WO | 2019/078129 A1 | 4/2019 |
| WO | 2021/029099 A1 | 2/2021 |
| WO | 2021/029404 A1 | 2/2021 |
| WO | 2021/156991 A1 | 8/2021 |

* cited by examiner

FIG.5

```
BASIC INFORMATION #####
DateTime,2021/08/03 13:15:49
ToolId,XXXXXXXXXXXX
SamplingFreq,2000
  ...

CUTTING MACHINING INFORMATION #####
MACHINING CONDITION ITEM, MACHINING PATH 1, MACHINING PATH 2,
MACHINING PATH 3, MACHINING PATH 4
WORKPIECE MATERIAL,SKD123,SKD123,SKD123,SKD123
CUTTING SPEED, 5, 10, 4, 10
TOOL MATERIAL KIND, CD00, CD00, CD00, CD00

SENSOR DATA #####
DATE, TIME, STRAIN SENSOR ch0, STRAIN SENSOR ch1, ...
2021/08/03,13:15:50.248,720.77391,602.72217, ...
2021/08/03,13:15:50.248,720.7137,602.66196, ...
```

ANALYSIS DEVICE, ANALYSIS METHOD, MACHINING SYSTEM, AND PROGRAM

CROSS-REFERENCE TO RELATED APPLICATION

The present application is based on PCT/JP2021/038357, filed on Oct. 18, 2021, the entire contents of which are incorporated herein by reference.

TECHNICAL FIELD

The present disclosure relates to an analysis device, an analysis method, a machining system, and a program.

BACKGROUND ART

PTL 1 (Japanese National Patent Publication No. 2018-534680) discloses a combined system that includes a control system and a monitoring system. A processor unit of the monitoring system analyzes the data received by an input unit, and estimates the state of a tool or the state of a subtraction process that is executed by the interaction between the tool and a work-piece.

CITATION LIST

Patent Literature

PTL 1: Japanese National Patent Publication No. 2018-534680

SUMMARY OF INVENTION

An analysis device according to the present disclosure analyzes the state of a machining tool. The analysis device includes: an acquisition unit that acquires a measurement result from at least one sensor fitted to the machining tool; a computation unit that performs data processing to the measurement result acquired by the acquisition unit; and an image processing unit that displays a first image and a second image on a display screen, the first image displaying the measurement result acquired by the acquisition unit in time-series, the second image displaying a computation result after the data processing is performed by the computation unit. The image processing unit displays, as the second image, the computation result corresponding to the measurement result for a specific time period in the first image.

A machining system according to the present disclosure includes: a machine tool that performs machining using a machining tool that includes at least one sensor; and an analysis device that analyzes the state of the machining tool that is used in the machine tool. The analysis device includes: an acquisition unit that acquires a measurement result from the sensor; a computation unit that performs data processing to the measurement result acquired by the acquisition unit; and an image processing unit that displays a first image and a second image on a display screen, the first image displaying the measurement result acquired by the acquisition unit in time-series, the second image displaying a computation result after the data processing is performed by the computation unit. The image processing unit displays, as the second image, the computation result corresponding to the measurement result for a specific time period in the first image.

An analysis method according to the present disclosure is a method for analyzing the state of a machining tool. The analysis method includes: acquiring a measurement result from at least one sensor fitted to the machining tool; performing data processing to the acquired measurement result; displaying, as a first image, the acquired measurement result in time-series; and displaying, as a second image, a computation result after the data processing is performed to the measurement result for a specific time period specified in the first image.

A program according to the present disclosure is executed by an analysis device that analyzes the state of a machining tool. The program includes: acquiring a measurement result from at least one sensor fitted to the machining tool; performing data processing to the acquired measurement result; displaying, as a first image, the acquired measurement result in time-series; and displaying, as a second image, a computation result after the data processing is performed to the measurement result for a specific time period specified in the first image.

BRIEF DESCRIPTION OF DRAWINGS

FIG. 5 is a diagram showing an example of a measurement result that is stored in a storage device according to the embodiment.

FIG. 8A is a diagram showing an example of an image for adding information about the machining condition that is written in the measurement result in the analysis device according to the embodiment.

FIG. 8B is a diagram showing an example of an image for removing information about the machining condition that is written in the measurement result in the analysis device according to the embodiment.

DETAILED DESCRIPTION

Figure 1:
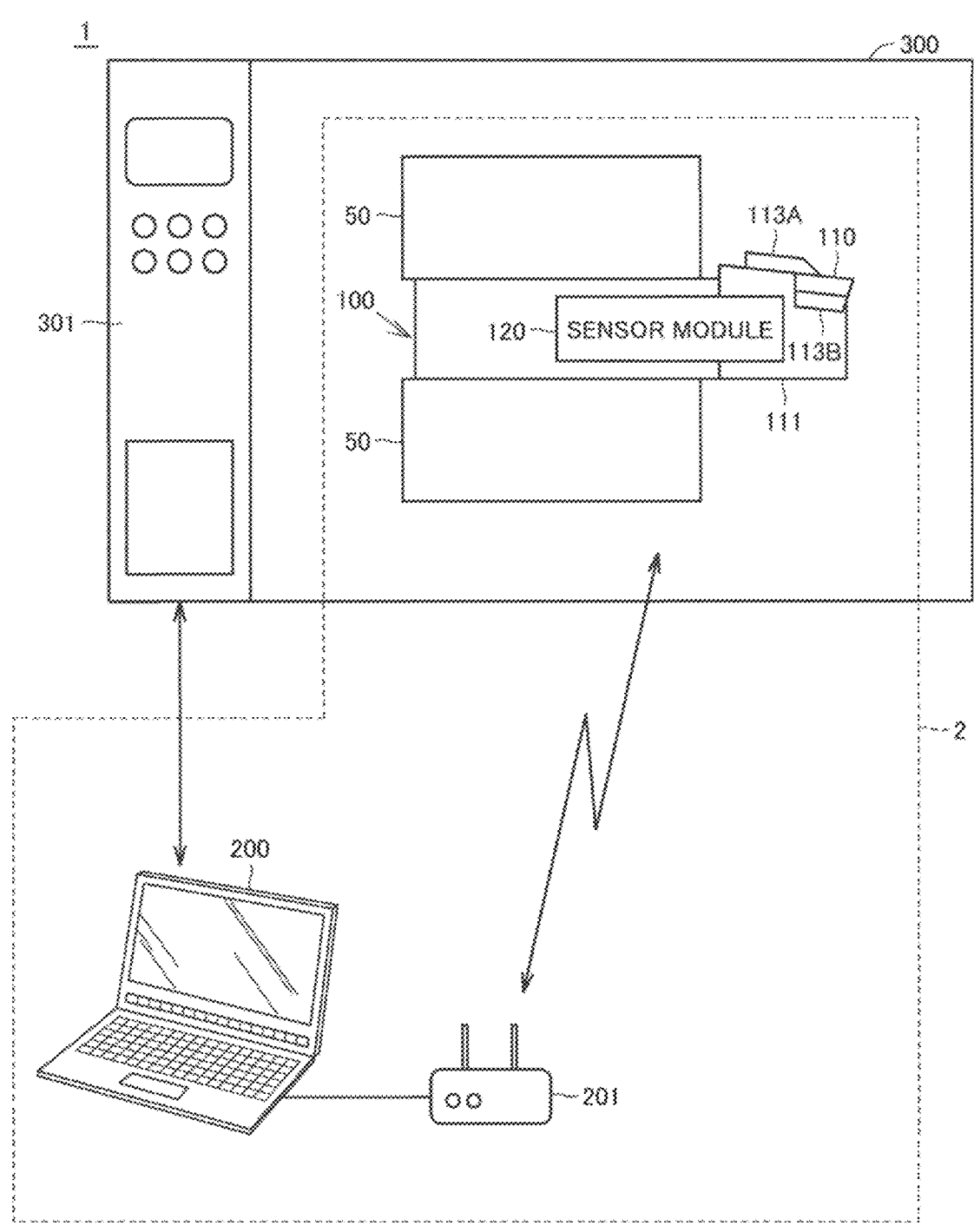
FIG. 1 is a diagram showing the configuration of a machining system according to an embodiment.

Problem to be Solved by the Present Disclosure

PTL 1 describes a technology in which the state of the machining tool is analyzed, but beyond the technology, a technology in which information necessary for the determination about the state of the machining tool can be provided to a user such that the user can more accurately determine the state of the machining tool is demanded.

An object of the present disclosure is to provide an analysis device, an analysis method, a machining system, and a program that make it possible to analyze the state of the machining tool.

Advantageous Effect of the Present Disclosure

According to the present disclosure, it is possible to provide an analysis device, an analysis method, a machining system, and a program that make it possible to provide information allowing the state of the machining tool to be more accurately determined, to the user.

DESCRIPTION OF EMBODIMENTS

First, contents of embodiments of the present disclosure are listed and described.

(1) An analysis device according to the present disclosure analyzes the state of a machining tool. The analysis device includes: an acquisition unit that acquires a measurement result from at least one sensor fitted to the machining tool; a computation unit that performs data processing to the measurement result acquired by the acquisition unit; and an image processing unit that displays a first image and a second image on a display screen, the first image displaying the measurement result acquired by the acquisition unit in time-series, the second image displaying a computation result after the data processing is performed by the computation unit. The image processing unit displays, as the second image, the computation result corresponding to the measurement result for a specific time period in the first image.

Since the image processing unit displays, as the second image, the computation result corresponding to the measurement result for the specific time period in this way, the computation result after the data processing is performed for the specific time period to which a user pays attention can be displayed so as to directly correspond to the measurement result, and information allowing the state of the machining tool to be more accurately determined can be provided to the user.

(2) Preferably, the image processing unit should display the first image and the second image on an identical display screen.

By this configuration, for example, the computation result after the data processing is performed for the specific time period directly corresponds to the measurement result, causing a display that makes it easy for the user to overview the information.

(3) Preferably, the analysis device should further include an input unit that accepts a user's operation, in which when the input unit accepts the specific time period altered by the user's operation, the image processing unit displays, as the second image, the computation result corresponding to the measurement result for the altered specific time period.

By this configuration, for example, the user oneself can alter the specific time period to which the user wants to pay attention, and can display the computation result corresponding to the measurement result for the altered specific time period, on the display screen, by the selection from the measurement result displayed in time-series.

(4) Preferably, the input unit should accept, as the specific time period, a time point and a time period that are specified on the first image by the user's operation.

By this configuration, for example, it is possible to freely select the specific time period to which the user wants to pay attention, from the measurement result displayed in time-series.

(5) Preferably, the measurement result acquired by the acquisition unit should include tool information about the machining tool, and the image processing unit should alter kinds of the measurement result and the computation result that are displayed on the display screen, based on the tool information acquired by the acquisition unit.

By this configuration, for example, it is possible to appropriately alter the information that is displayed on the display screen, depending on the kind of the machining tool.

(6) Preferably, when the acquisition unit acquires the measurement result from a plurality of sensors, the computation unit should perform data processing of associating a plurality of measurement results acquired by the acquisition unit, and the image processing unit should display computation results associated with the plurality of measurement results by the computation unit, in the second image.

By this configuration, for example, the information allowing the state of the machining tool to be more accurately determined can be provided to the user.

(7) Preferably, the image processing unit should display the computation results associated with the plurality of measurement results by the computation unit, in the second image, while showing the computation results in a spatial coordinate system.

By this configuration, for example, the information allowing the state of the machining tool to be more accurately determined can be provided to the user.

(8) Preferably, the analysis device should further include a storage that stores the measurement result, in which when the measurement result is stored in the storage, information about a machining condition is added and is stored as one file, and when the acquisition unit acquires a plurality of files from the storage by selecting the machining condition, the image processing unit arrays and displays the first image and the second image on the display screen, for each machining condition.

By this configuration, for example, it is possible to array and display measurement results and computation results under the same machining condition, such that the user easily performs the comparison, and the information allowing the state of the machining tool to be more accurately determined can be provided to the user.

(9) A machining system according to the present disclosure includes: a machine tool that performs machining using a machining tool that includes at least one sensor; and an analysis device that analyzes the state of the machining tool that is used in the machine tool. The analysis device includes: an acquisition unit that acquires a measurement result from the sensor; a computation unit that performs data processing to the measurement result acquired by the acquisition unit; and an image processing unit that displays a first image and a second image on a display screen, the first image displaying the measurement result acquired by the acquisition unit in time-series, the second image displaying a computation result after the data processing is performed by the computation unit. The image processing unit displays, as the second image, the computation result corresponding to the measurement result for a specific time period in the first image.

Since the image processing unit displays, as the second image, the computation result corresponding to the measurement result for the specific time period in this way, the computation result after the data processing is performed for the specific time period to which the user pays attention can be displayed so as to directly correspond to the measurement result, and the information allowing the state of the machining tool to be more accurately determined can be provided to the user.

(10) An analysis method according to the present disclosure is a method for analyzing the state of a machining tool. The analysis method includes: acquiring a measurement result from at least one sensor fitted to the machining tool; performing data processing to the acquired measurement result; displaying, as a first image, the acquired measurement result in time-series; and displaying, as a second image, a computation result after the data processing is performed to the measurement result for a specific time period specified in the first image.

Since the computation result corresponding to the measurement result for the specific time period is displayed as the second image in the analysis method in this way, the computation result after the data processing is performed for the specific time period to which the user pays attention can be displayed so as to directly correspond to the measurement result, and the information allowing the state of the machining tool to be more accurately determined can be provided to the user.

(11) A program according to the present disclosure is executed by an analysis device that analyzes the state of a machining tool. The program includes: acquiring a measurement result from at least one sensor fitted to the machining tool; performing data processing to the acquired measurement result; displaying, as a first image, the acquired measurement result in time-series; and displaying, as a second image, a computation result after the data processing is performed to the measurement result for a specific time period specified in the first image.

Since the computation result corresponding to the measurement result for the specific time period is displayed as the second image in the program in this way, the computation result after the data processing is performed for the specific time period to which the user pays attention can be displayed so as to directly correspond to the measurement result, and the information allowing the state of the machining tool to be more accurately determined can be provided to the user.

DETAILS OF EMBODIMENTS IN THE PRESENT DISCLOSURE

With reference to the drawings, an embodiment in the present disclosure will be described below in detail. In the following descriptions, identical or corresponding elements are denoted by identical reference characters, and detailed descriptions therefor are not repeated.
<Configuration of Machining System>
With reference to FIG. 1 to FIG. 3, the configuration of a machining system 1 according to the embodiment will be described.

FIG. 1 is a diagram showing the configuration of the machining system according to the embodiment. As shown in FIG. 1, machining system 1 includes a cutting tool 100, an analysis device 200, a wireless device 201, a machine tool 300, and a machining control device 301.

Cutting tool 100 is attached to machine tool 300. Cutting tool 100, which is an example of the machining tool, is not limited to a machining tool that is used for cutting machining if the machining tool is a machining tool that is attached to machine tool 300, and only needs to be a machining tool that is widely used for machining.

Machining control device 301 controls machine tool 300 in accordance with machining path information and a cutting condition that are set, and performs the cutting machining of a workpiece with attached cutting tool 100. The machining path information includes information such as the coordinate position of cutting tool 100, the locus of cutting tool 100, and the number of paths. The cutting condition includes information such as the cutting way of cutting tool 100, the feed way (feed speed) of cutting tool 100, and the cutting speed of cutting tool 100. In the embodiment, the machining path information and the cutting condition are collectively referred to as a mechanical machining condition, and hereinafter, the mechanical machining condition includes information about at least one of the machining path information and the cutting condition.

In machining system 1 according to the embodiment, a sensor module 120 is provided in cutting tool 100, and the load on cutting tool 100 can be measured by a sensor. Therefore, analysis device 200 can analyze the load on cutting tool 100, based on information received from sensor module 120. Machining system 1 analyzes the load on cutting tool 100 with analysis device 200, and thereby, can analyze whether an excessive load causing the decrease in machining accuracy or the breakage of cutting tool 100 is not generated on cutting tool 100. As described later, analysis device 200 can analyze the load on cutting tool 100 by the comparison with measurement results and computation results in the machining performed under the same mechanical machining condition in the past.

Specifically, machining system 1 sends the information (measurement result) about the load on cutting tool 100 that is measured by sensor module 120, to wireless device 201, as a wireless signal, and stores the information about the load on cutting tool 100 received by wireless device 201, in a storage device 213 of analysis device 200. General analysis devices merely simply display the information about the load on the cutting tool that is received or the information about the load on the cutting tool that is stored in storage device 213, in time-series. Therefore, although the user can determine that the machining accuracy decreases or cutting tool 100 breaks in the case where the load on the cutting tool that is displayed in time-series greatly changes, the user cannot more accurately determine the state of the machining tool, from merely the simple time-series display of the information about the load on the cutting tool, in the case where the change in the load on the cutting tool is small. The measurement result includes not only output values from sensors such as a strain sensor but also values after the output values are converted by prescribed conversion equations.

Hence, analysis device 200 not only displays an image (first image) that displays the information about the load on cutting tool 100 in time-series but also displays a computation result after data processing is performed to the information about the load on cutting tool 100 for a specific time period, as an image (second image), on a display screen of a display 214. Therefore, in analysis device 200, a time period when a small change that is overlooked on merely the simple time-series display of the information about the load on the cutting tool occurs is adopted as the specific time period, and the measurement result for the specific time period can be processed to information that can be recognized by the user, by data processing, and can be displayed, so that the user can more accurately determine the state of the machining tool.

Machining system 1 can be realized by combining cutting tool 100 having sensor module 120 built in, analysis device 200 and wireless device 201, with existing machine tool 300. That is, machining system 1 can be realized by preparing a machining tool analysis system 2 configured to include cutting tool 100, analysis device 200 and wireless device 201 and thereafter incorporating machining tool analysis system 2 in existing machine tool 300. Machining system 1 and machining tool analysis system 2 shown in FIG. 1 show an example, and another configuration may be adopted. Further, machining system 1 is not limited to a configuration in which one cutting tool 100 is included, and may have a configuration in which a plurality of cutting tools 100 is included. Furthermore, machining system 1 is not limited to a configuration in which one analysis device 200 is included, and may have a configuration in which a plurality of analysis devices 200 is included.

Individual configurations will be described below in more detail.

<Cutting Tool>

As shown in FIG. 1, cutting tool 100 is fixed so as to be vertically sandwiched by tool rests 50 in machine tool 300. For example, cutting tool 100 is a tool for lathe turning machining that is used for the machining of a rotating workpiece, and is attached to machine tool 300 such as a lathe.

A portion of cutting tool 100 that performs the cutting machining of the workpiece is a cutting insert 110 that includes a cutting blade, and cutting insert 110 can be replaced in the case of being worn or broken. Specifically, cutting tool 100 includes cutting insert 110 and a shank 111 that holds cutting insert 110. That is, cutting tool 100 is a so-called throwaway tool. Cutting insert 110 is held by fixing members 113A, 113B and shank 111.

Cutting tool 100 may have a configuration in which fixing members 113A, 113B are not included and cutting tool 100 itself includes a cutting blade. That is, cutting tool 100 may be a solid tool or a brazed tool.

Instead of the lathe turning tool, for example, cutting tool 100 may be a rotating tool that is attached to a machine tool such as a milling machine, for a machining scheme in which a tool rotates on a fixed workpiece. More specifically, cutting tool 100 may be a milling cutter or drill to which cutting insert 110 can be attached, or may be an end mill or drill for which the cutting insert is not used.

<Sensor Module>

Figure 2:
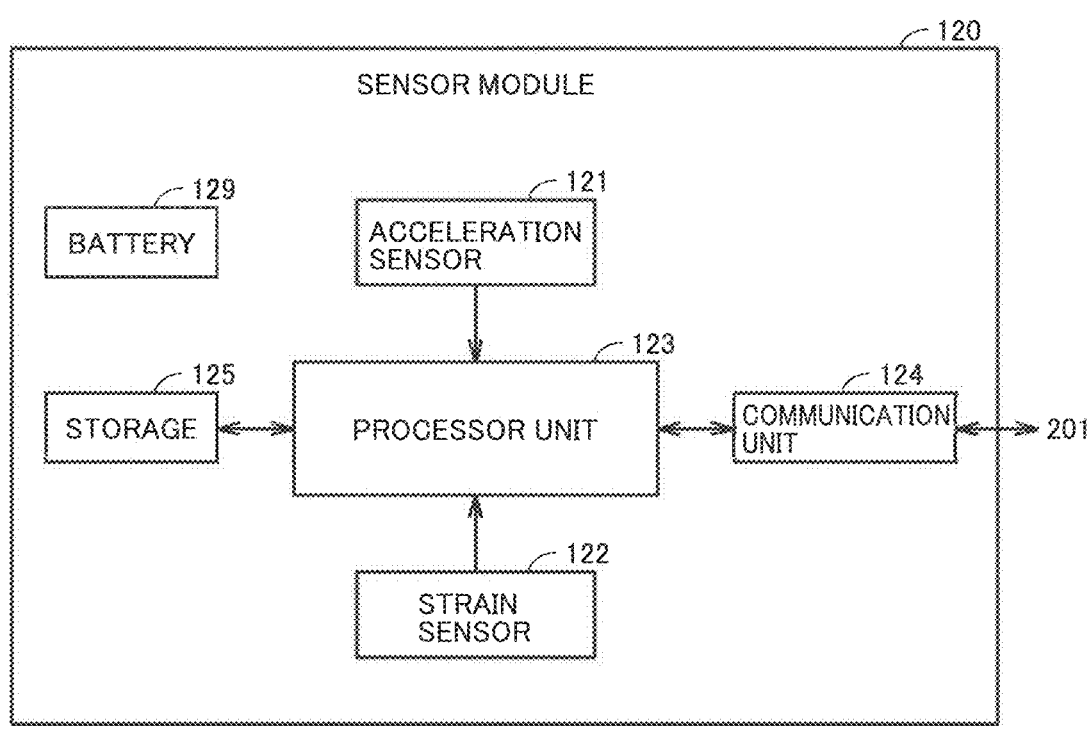
FIG. 2 is a diagram showing the configuration of a sensor module according to the embodiment.

FIG. 2 is a diagram showing the configuration of the sensor module according to the embodiment. Sensor module 120 includes an acceleration sensor 121, a strain sensor 122, a processor unit 123, a communication unit 124, a storage 125, and a battery 129. For example, sensor module 120 is started up by a user's operation.

For example, processor unit 123 is realized by a processor such as a CPU (Central Processing Unit) and a DSP (Digital Signal Processor). The processor may be a hardware circuit constituted by an ASIC (Application Specific Integrated Circuit). For example, communication unit 124 is realized by a communication circuit such as a communication IC (Integrated Circuit). For example, storage 125 is a non-volatile memory.

For example, battery 129 is an electric storage device including a primary battery, a secondary battery, a solar battery, a capacitor, or the like, and may have a contactless power feeding function. Battery 129 supplies electric power to circuits of acceleration sensor 121, strain sensor 122, processor unit 123 and communication unit 124.

For example, acceleration sensor 121 and strain sensor 122 are provided near the cutting blade of cutting tool 100. Sensor module 120 is not limited to a configuration in which one acceleration sensor 121 is included, and may have a configuration in which a plurality of acceleration sensors 121 is included. Further, sensor module 120 is not limited to a configuration in which one strain sensor 122 is included, and may have a configuration in which a plurality of strain sensors 122 is included. Further, sensor module 120 may have a configuration in which another sensor such as a pressure sensor and a displacement sensor is included instead of at least one of acceleration sensor 121 and strain sensor 122 or in addition to acceleration sensor 121 and strain sensor 122.

Processor unit 123 generates measurement information indicating the measurement value of acceleration sensor 121 and the measurement value of strain sensor 122. Specifically, at sampling timings according to a prescribed period, processor unit 123 performs AD (Analog Digital) conversion of analog signals received from acceleration sensor 121 and strain sensor 122, and generates the measurement values of the sensors that are digital values after the conversion.

Processor unit 123 outputs the measurement information including the measurement values of the sensors, to communication unit 124. Communication unit 124 sends packets in which the measurement information received from processor unit 123 is stored, to analysis device 200 through wireless device 201.

<Analysis Device>

Figure 3:
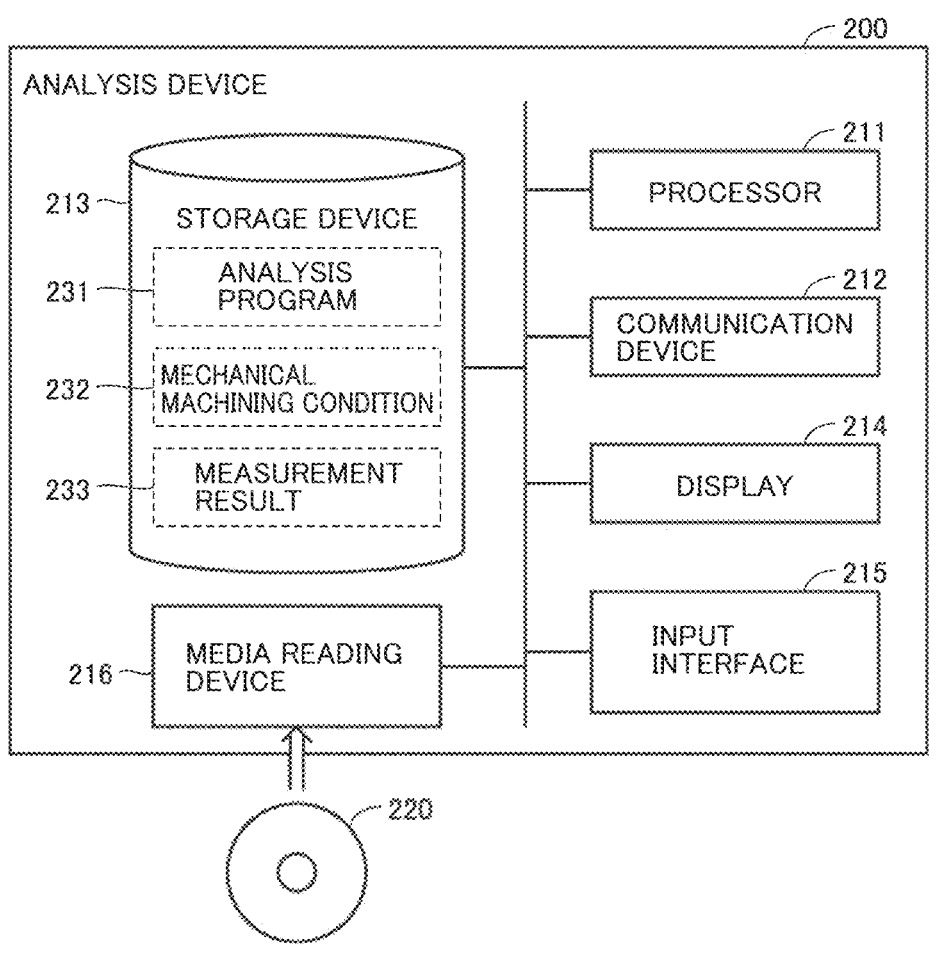
FIG. 3 is a diagram showing the configuration of an analysis device according to the embodiment.

FIG. 3 is a diagram showing the configuration of the analysis device according to the embodiment. As shown in FIG. 3, analysis device 200 includes a processor 211 (computation unit), a communication device 212, a storage device 213, a display 214, an input interface 215, and a media reading device 216.

Processor 211 is a computation subject that executes various procedures relevant to analysis device 200 by executing various programs (for example, a later-described analysis program 231). For example, processor 211 is constituted by a processor such as a CPU and a DSP. Processor 211 may be constituted by a calculation circuit (Processing Circuitry). Although not illustrated, processor 211 includes a memory that temporarily holds various programs to be executed, for example, a volatile memory such that a DRAM (Dynamic Random Access Memory) and an SRAM (Static Random Access Memory).

Communication device 212 establishes communication with each of machining control device 301 and sensor module 120 through communication means such as a network, and performs sending and receiving of data (information) with each of machining control device 301 and sensor module 120. Therefore, communication device 212 has a function as an acquisition unit that acquires the information about the load on cutting tool 100, from sensor module 120.

Storage device 213 is constituted by a non-volatile memory such as a ROM (Read Only Memory), an SSD (Solid State Drive) and an HDD (Hard Disk Drive). Storage device 213 stores analysis program 231, a mechanical machining condition 232 for the machine tool that is acquired from machining control device 301, and a measurement result 233 that is measured by the sensor. Measurement result 233 that is stored in storage device 213 includes all measurement results from machining start to machining end, and is stored as a data file for each machining. In measurement result 233 that is stored in storage device 213, as described later, information about a machining condition is stored in a header portion of the data. Mechanical machining condition 232 for the machine tool and measurement result 233 measured by the sensor may be stored not in storage device 213 but in a storage device (for example, a server or the like) that is connected with analysis device 200 directly or through a network. Further, in the case of a configuration in which analysis device 200 does not acquire mechanical machining condition 232 for the machine tool from machining control device 301, mechanical machining condition 232 is not stored in storage device 213.

Analysis program 231 is a program that is executed by processor 211 (computation unit), that performs data processing to the measurement result measured by the sensor, and that displays the measurement result and the computation result after the data processing is performed, on display 214. By executing analysis program 231, processor 211 executes a later-described process in a flowchart of FIG. 4.

Media reading device 216 accepts a recording medium 220 in which a variety of programs and data are recorded, and reads the programs and the data from recording medium 220. As recording medium 220, there are a CD (Compact Disk), an SD card (Secure Digital card), a USB memory (Universal Serial Bus memory) and the like. In the embodiment, media reading device 216 reads analysis program 231 stored in recording medium 220, and causes storage device 213 to store analysis program 231.

Display 214 is a device that displays an image processed by processor 211, on the display screen. For example, display 214 displays a first image that displays a measurement result in time-series and a second image that displays a computation result after the data processing is performed. Display 214 displays screens for a variety of information, to the user, other than the image that displays the measurement result in time-series. Although it has been described that the image that is displayed on display 214 is processed by processor 211, an image processing processor (GPU: Graphics Processing Unit) may be provided separately from processor 211, and the processing may be performed by the image processing processor. Processor 211 or the image processing processor has a function as an image processing unit that displays an image on the display screen of display 214.

Input interface 215 is an interface that accepts the input of data to analysis device 200, and input devices such as a keyboard and a mouse that can be operated by the user are connected. For example, the user can cause input interface 215 to accept a user's operation such as an operation for display switching and an operation for altering the layout of an image, using the input devices. That is, the input interface 215 has a function as an input unit that accepts the user's operation.

<Wireless Device>

Wireless device 201 is connected with analysis device 200, for example, through a wire. For example, wireless device 201 is an access point. Wireless device 201 acquires the wireless signal received from cutting tool 100, and relays the wireless signal to analysis device 200. For example, wireless device 201 performs, with cutting tool 100, wireless communication using a communication protocol such as ZigBee® complying with IEEE 802.15.4, Bluetooth® complying with IEEE 802.15.1, and UWB (Ultra-Wide Band) complying with IEEE 802.15.3a. A communication protocol other than the above description may be used between cutting tool 100 and wireless device 201.

<Analysis Process>

Figure 4:
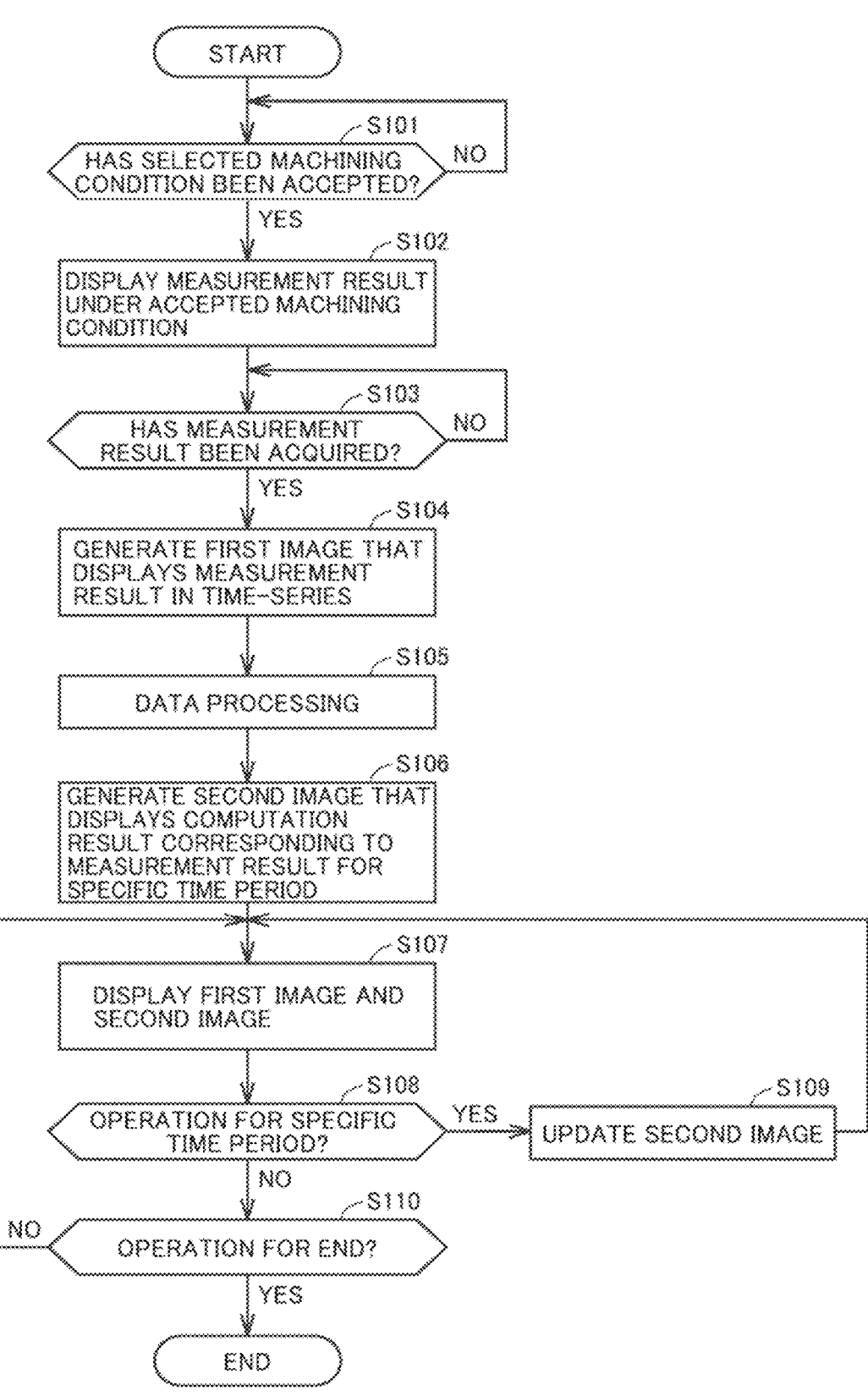
FIG. 4 is a flowchart showing a process that is executed in a processor of the analysis device according to the embodiment.

Next, a process of analyzing the information about the load on cutting tool 100 in machining system 1 will be described. FIG. 4 is a flowchart showing a process that is executed in the processor of the analysis device according to the embodiment. A processing step (this is abbreviated as "S", hereinafter) shown in FIG. 4 is realized by the execution of analysis program 231 by processor 211 of analysis device 200.

First, analysis device 200 acquires the measurement result about an analysis object, from storage device 213. On that occasion, analysis device 200 can select the measurement result that is acquired from storage device 213, based on the machining condition. Specifically, in storage device 213, past measurement results for machining under various machining conditions are stored, and analysis device 200 can acquire, from storage device 213, past measurement results for machining under the same machining condition, and can compare and analyze the measurement results.

In order to do that, the information about the machining condition needs to be previously added in measurement result 233 stored in storage device 213. In the case where the machining tool is cutting tool 100, the information about the machining condition that is added includes information such as a workpiece material, a tool material kind, the cutting way of cutting tool 100, the feed way (feed speed) of cutting tool 100, and the cutting speed of cutting tool 100, and further includes the information about a machining path. The machining path is route information about the tool in the machine tool when the machined material (workpiece material) is machined. As a condition for discriminating a machining path and another machining path, for example, there are a) a case where the machining spot of the machined material, as exemplified by an end face and a counterbore, changes, at the time of the machining of the machined material, b) a case where there is a certain non-machining time (a time during which the workpiece material is not machined) within the time of machining of an identical machined material, and the like. Further, the machining path can be defined as a machining unit in which at least one of parameters such as the coordinate position of cutting tool 100, the locus of cutting tool 100, and the number of repetitions differs.

Specifically, in measurement result 233 stored in storage device 213, the information about the machining condition is stored in the header portion of the data. FIG. 5 is a diagram showing an example of the measurement result stored in the storage device according to the embodiment. In FIG. 5, "BASIC INFORMATION" and "CUTTING MACHINING INFORMATION" are included in the header portion of the data, and "SENSOR DATA" is included in a body portion of the data. In "BASIC INFORMATION", the date and time ("DateTime") of the measurement, the identification information ("ToolId") about cutting tool 100, and the measurement frequency ("SamplingFreq") are stored. In "CUTTING MACHINING INFORMATION", the information about the workpiece material, the cutting speed, and the tool material kind is stored for each machining path. The information about the machining condition may include "BASIC INFORMATION" and "CUTTING MACHINING INFORMATION", or the information about the machining condition may include only "CUTTING MACHINING INFORMATION".

Since the information about the machining condition is stored in measurement result 233 in this way, analysis device 200 can select and acquire only measurement result 233 about the same machining path, from storage device 213. First, analysis device 200 accepts the machining condition selected by the user (S101). Analysis device 200 displays measurement result 233 that is of measurement result 233 stored in storage device 213 and that matches with the machining condition accepted in S101, on display 214 (S102). For example, analysis device 200 displays a list of file names of measurement result 233 that matches with the accepted machining condition, on display 214. Since the identification information about cutting tool 100 and the tool information such as the tool material kind are included in the information about the machining condition that is stored in the header portion, analysis device 200 may set the kinds (for example, the number of channels (CH) that are displayed, or the like) of the measurement result and the computation result that are displayed on the display screen, based on the tool information.

Therefore, the user can select measurement result 233 that is desired to be acquired, from the list of the file names of measurement result 233 that is displayed on display 214. In the case where the user selects measurement result 233 that is desired to be acquired, analysis device 200 determines whether measurement result 233 selected by the user has been acquired from storage device 213 (S103). In the case where it is determined that the measurement result has not been acquired (NO in S103), analysis device 200 returns the process to S103, and maintains the acquisition state for the measurement result.

On the other hand, in the case where it is determined that the measurement result has been acquired (YES in S103), analysis device 200 generates the first image that displays the measurement result in time-series (S104).

Analysis device 200 performs the data processing to acquired measurement result 233 (S105). Specifically, analysis device 200 performs the data processing (for example, preprocessing, the calculation of a feature quantity, the calculation of a basic static, and the calculation of correlation), to the measurement results of acceleration sensor 121 and strain sensor 122 that are included in acquired measurement result 233. As the preprocessing, for example, processes such as the removal or complementation of a missing value, noise processing, FFT (Fast Fourier Transform) processing, vector transformation [magnitude, direction], and dimension compression are performed. As the calculation of the feature quantity, calculations of the cutting resistance of the cutting tool, the torque of the cutting tool, and the like are performed. Further, as the calculation of the basic static, for example, calculations of arithmetic mean, geometric mean, trimmed mean, dispersion, standard deviation, skewness, kurtosis, median, maximum, minimum, and the like are performed. As the calculation of the correlation, for example, associating of measurement results from a plurality of sensors, calculations of covariance, correlation coefficient, partial correlation coefficient, factor loading, principal component score, and the like are performed. The data processing to measurement result 233 only needs to include one calculation of the calculation of the feature quantity, the calculation of the basic static, and the calculation of the correlation.

Analysis device 200 generates the second image that displays the computation result corresponding to the measurement result for a specific time period in the measurement result displayed in time-series (S106). In S105, analysis device 200 performs the data processing only to the measurement result for the specific time period, and generates the second image with the computation result thereof. Naturally, in S105, analysis device 200 may previously perform the data processing about the whole measurement time period of the measurement result displayed in time-series, may take out the computation result corresponding to the measurement result for the specific time period, and may generate the second image.

Figure 6:
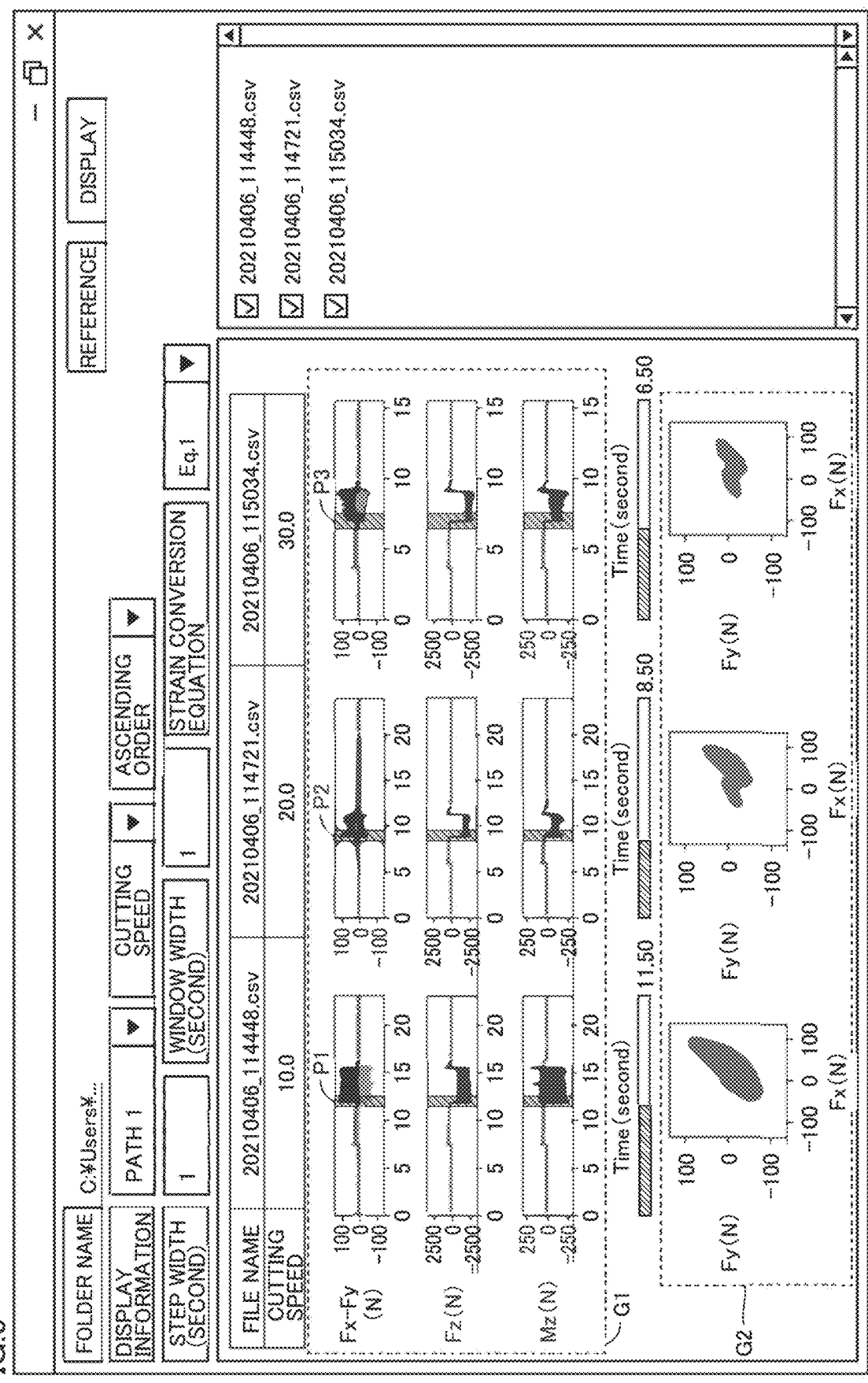
FIG. 6 is a diagram showing an example of an image that is displayed by the analysis device according to the embodiment.

Analysis device 200 displays the first image and the second image on the display screen of display 214 (S107). FIG. 6 is a diagram showing an example of the image that is displayed by the analysis device according to the embodiment. In FIG. 6, three measurement results 233 for which the machining condition is "PATH 1" are displayed as measurement result 233 stored in Users folder of a C drive of storage device 213. Further, in FIG. 6, three measurement results 233 under the same machining condition "PATH 1" are displayed in an order from the slowest cutting speed (in ascending order) from the left side in the figure. First, measurement result 233 in "20210406_114448.csv" (also referred to as measurement result 233 in "48" hereinafter) is displayed at the left side in the figure, measurement result 233 in "20210406_114721.csv" (also referred to as measurement result 233 in "21" hereinafter) is displayed at the center in the figure, and measurement result 233 in "20210406_115034.csv" (also referred to as measurement result 233 in "34" hereinafter) is displayed at the right side in the figure.

For measurement result 233 in "48", the cutting speed is 10.0 mm/sec. Loads on cutting tool 100 after measurement values of a plurality of strain sensors 122 provided on cutting tool 100 are converted using a prescribed strain conversion equation are displayed in time-series. Specifically, a graph in which loads (Fx, Fy) in the X-direction and Y-direction of cutting tool 100 are displayed in time-series, a graph in which loads (Fz) in the Z-direction of cutting tool 100 are displayed in time-series, and a graph in which loads (Mz) in the moment direction of cutting tool 100 are displayed in time-series are arrayed in the upper-lower direction in the figure. These three graphs constitute a first image G1 that displays measurement result 233 in "48" in time-series. In the three graphs, the horizontal axis indicates time [second], and the vertical axis indicates load [N].

A specific time period P1 in first image G1 is set for 1 second from a measurement time of 11.50 seconds. In the example shown in FIG. 6, the window width in specific time period P1 is set to 1 second. Further, the step width in specific time period P1 is set to 1 second, and therefore the window width can be altered on a second-by-second basis.

In FIG. 6, a second image G2 is displayed below first image G1 that displays the measurement results in time-series. Second image G2 shows the computation result in "48" in which the load (Fx) in the X-direction of cutting tool 100 and the load (Fy) component in the Y-direction are associated and are expressed in a two-dimensional spatial coordinate system (XY plot). Therefore, analysis device 200 can cause the user to planarly know the load in the XY direction of cutting tool 100 for specific time period P1, and can provide information allowing the state of cutting tool 100 to be more accurately determined, to the user. In the XY plot of second image G2, the horizontal axis indicates the load [N] in the X-axis direction, and the vertical axis indicates the load [N] in the Y-axis direction. Further, on the upper side of the second image G2, a time bar is displayed such that the position of specific time period P1 in the measurement time period is easily known.

Similarly, for measurement result 233 in "21", the cutting speed is 20.0 mm/sec. A graph in which loads (Fx, Fy) in the X-direction and Y-direction of cutting tool 100 are displayed in time-series, a graph in which loads (Fz) in the Z-direction of cutting tool 100 are displayed in time-series, and a graph in which loads (Mz) in the moment direction of cutting tool 100 are displayed in time-series are arrayed in the upper-lower direction in the figure. These three graphs constitute a first image G1 that displays measurement result 233 in "21" in time-series.

A specific time period P2 in first image G1 is set for 1 second from a measurement time of 8.50 seconds. In FIG. 6, a second image G2 is displayed below first image G1 that displays the measurement results in time-series. Second image G2 shows the computation result in "21" in which the load (Fx) in the X-direction of cutting tool 100 and the load (Fy) component in the Y-direction are associated and are expressed in a two-dimensional spatial coordinate system (XY plot).

Similarly, for measurement result 233 in "34", the cutting speed is 30.0 mm/sec. A graph in which loads (Fx, Fy) in the X-direction and Y-direction of cutting tool 100 are displayed in time-series, a graph in which loads (Fz) in the Z-direction of cutting tool 100 are displayed in time-series, and a graph in which loads (Mz) in the moment direction of cutting tool 100 are displayed in time-series are arrayed in the upper-lower direction in the figure. These three graphs constitute a first image G1 that displays measurement result 233 in "34" in time-series.

A specific time period P3 in first image G1 is set for 1 second from a measurement time of 6.50 seconds. In FIG. 6, a second image G2 is displayed below first image G1 that displays the measurement results in time-series. Second image G2 shows the computation result in "34" in which the load (Fx) in the X-direction of cutting tool 100 and the load (Fy) component in the Y-direction are associated and are expressed in a two-dimensional spatial coordinate system (XY plot).

By arraying and displaying measurement results 233 different in cutting speed under the same machining condition "PATH 1" and the computation results as shown in FIG. 6, analysis device 200 can easily know how the load on cutting tool 100 changes when the cutting speed changes. Furthermore, since the computation result after the data processing is performed for specific time periods P1 to P3 to which the user pays attention is displayed so as to directly correspond to the measurement result, the analysis device 200 can provide the information allowing the state of cutting tool 100 to be more accurately determined, to the user.

Specific time periods P1 to P3 to which the user pays attention can be arbitrarily altered by the user oneself. Back to FIG. 4, analysis device 200 determines whether an operation for the specific time period in which the time point and time period specified on the first image are altered by the user's operation has been accepted (S108). In the case where the operation for altering the specific time period has been accepted (YES in S108), analysis device 200 updates the display such that the second image displays the computation result corresponding to the measurement result for the altered specific time period (S109). For example, the specified time point in specific time period P1 shown in FIG. 6 is altered from a measurement time of 11.50 seconds to 15.00 seconds, and the time period (window width) is altered from 1 second to 2 seconds. In the case where the data processing is previously performed about the whole measurement time period, analysis device 200 merely updates the display of the second image to the computation result for altered specific time period P1, but in the case where the data processing is not previously performed, analysis device 200 needs to perform the data processing to the measurement result for altered specific time period P1.

In the case where analysis device 200 updates the display of the second image, analysis device 200 returns the process to S107, and displays the first image and the updated second image on the display screen of display 214.

On the other hand, in the case where the operation for altering the specific time period has not been accepted (NO in S108), analysis device 200 determines whether an operation for ending the analysis of the measurement result has been accepted (S110). In the case where it is determined that the operation for ending the analysis of the measurement result has been accepted (YES in S110), analysis device 200 ends the process. In the case where it is determined that the operation for ending the analysis of the measurement result has not been accepted (NO in S110), analysis device 200 returns the process to S107, and keeps the display of the first image and the second image on the display screen of display 214.

It has been described that the XY plot of the load on cutting tool 100 is displayed in second image G2 shown in FIG. 6, but without being limited to this, a statistic of the computation result after the data processing, as exemplified by average, dispersion, and standard deviation, the correlation coefficient of cutting tool 100, or the like may be displayed.

<Edit of Information about Machining Condition>

Next, the edit of the information about the machining condition that is stored in the header portion of measurement result 233 will be described. The information about the machining condition that is stored in the header portion of measurement result 233 may be automatically extracted by analysis device 200, from mechanical machining condition 232 for the machine tool that is acquired from machining control device 301. However, the data format of mechanical machining condition 232 is different depending on the kind of the machine tool, and therefore the information about the machining condition that is needed by the user cannot be obtained in some cases. Hence, analysis device 200 allows the user to edit the header portion of measurement result 233 that is stored in storage device 213, and stores the information about the machining condition that is needed by the user, in storage device 213, together with measurement result 233.

Figure 7:
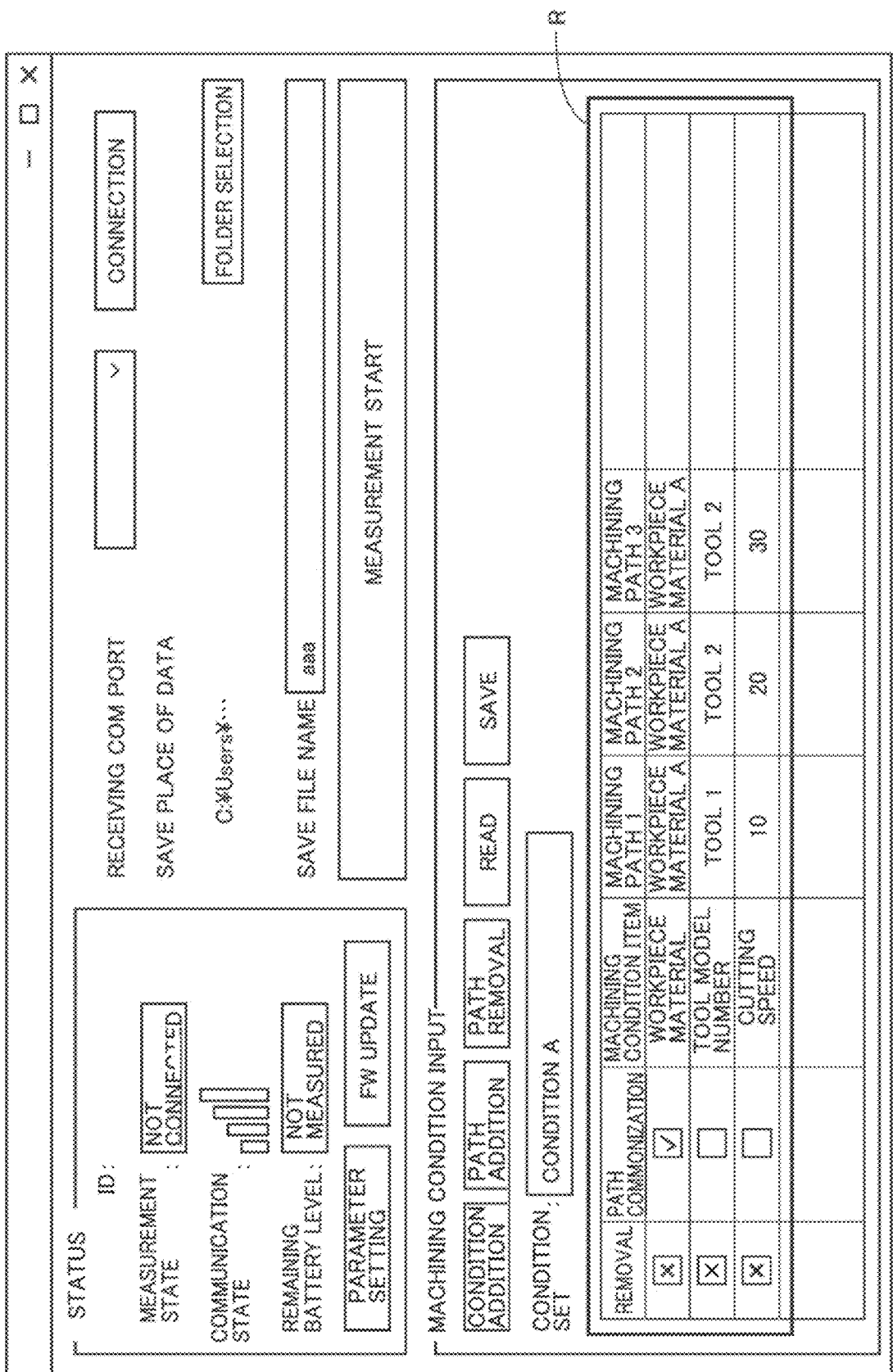
FIG. 7 is a diagram showing an example of an image for setting information about a machining condition that is written in the measurement result in the analysis device according to the embodiment.

FIG. 7 is a diagram showing an example of an image for setting the information about the machining condition that is written in the measurement result in the analysis device according to the embodiment. A screen shown in FIG. 7 is a main screen of analysis device 200. On the main screen, "STATUS" indicating the state of the communication with sensor module 120, a field for setting the save place of measurement result 233, a connection button, a measurement start button, and the like are displayed. Furthermore, on the main screen, the field of "MACHINING CONDITION INPUT" is displayed on the lower side of "STATUS" and the measurement start button, such that the user sets the information about the machining condition.

In the field of "MACHINING CONDITION INPUT", when the information about the machining condition that is used in the cutting machining is saved, it is possible to input the item of the machining condition for each machining path, instead of simply inputting the item of the machining condition. In an input field R shown in FIG. 7, the item of the machining condition is set on each line, and the machining path is set on each column. Specifically, workpiece material is set as the item of the machining condition on the first line, tool model number is set as the item of the machining condition on the second line, and cutting speed is set as the item of the machining condition on the third line. Three machining paths: a machining path 1, a machining path 2, and a machining path 3 are set in the column direction.

In the field of "MACHINING CONDITION INPUT", the field of "REMOVAL" is provided on the column on the left side, and when the user depresses a button in the field, the information on the depressed line is removed. Further, the field of "PATH COMMONIZATION" is provided on the second column from the left side, and when the user checks a checkbox in the field, the information on the checked line is input for all machining paths, as the same information. In the example shown in FIG. 7, the line of the item of the machining condition for the workpiece material is checked, and therefore, the information of a workpiece material A is input for each of the machining path 1, the machining path 2, and the machining path 3.

Figure 8A:
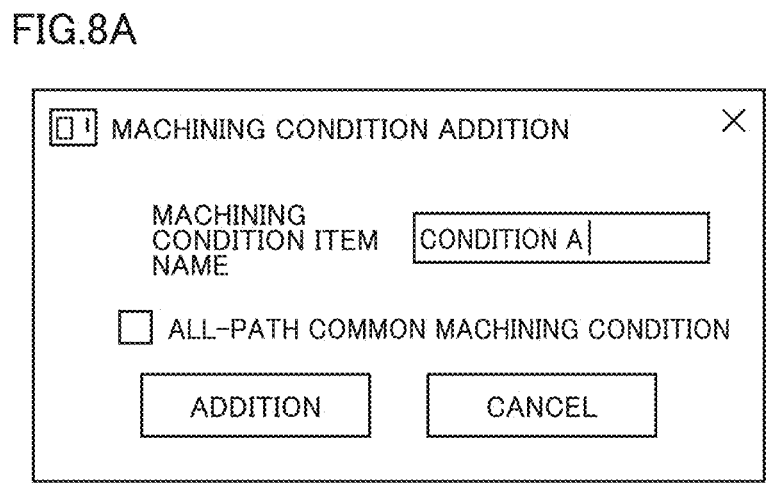
Figure 8B:
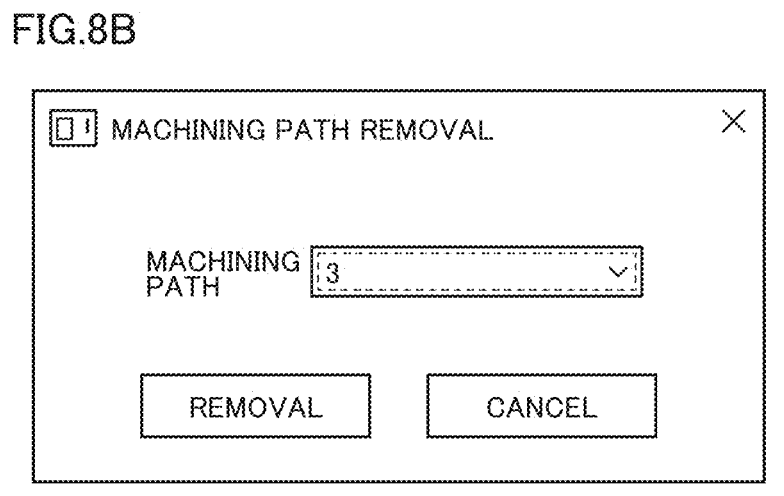

Next, the edit of the field of "MACHINING CONDITION INPUT" will be described. FIG. 8A is a diagram showing an example of an image for adding the information about the machining condition that is written in the measurement result in the analysis device according to the embodiment. FIG. 8B is a diagram showing an example of an image for removing the information about the machining condition that is written in the measurement result in the analysis device according to the embodiment. First, a case where the item of the machining condition is added in the field of "MACHINING CONDITION INPUT" will be described. When the user depresses a button for "CONDITION ADDITION", analysis device 200 displays a pop-up screen for machining condition addition that is shown in FIG. 8A. The user writes a necessary item of the machining condition into "MACHINING CONDITION ITEM NAME" on the pop-up screen, and depresses an "ADDITION" button, and thereby, analysis device 200 adds a line for the input item of the machining condition, in the field of "MACHINING CONDITION INPUT". A checkbox for all-path common machining condition is provided on the pop-up screen for machining condition addition that is shown in FIG. 8A. By checking the box, the field of "PATH COMMONIZATION" on the newly added line for the item of the machining condition is checked.

Next, a case where the machining path is removed in the field of "MACHINING CONDITION INPUT" will be described. When the user depresses a button for "PATH REMOVAL", analysis device 200 displays a pop-up screen for machining path removal that is shown in FIG. 8B. The user selects the number of the machining path that is desired to be removed, from a pull-down menu in "MACHINING PATH" on the pop-up screen, and depresses a "REMOVAL" button, and thereby, analysis device 200 removes the column for the selected machining path, from the field of "MACHINING CONDITION INPUT". In the case where the machining path is added, the user depresses a button for "PATH ADDITION", and then an undisplayed pop-up screen for machining path addition is displayed. The user selects the number of the machining path that is desired to be added, from a pull-down menu in "MACHINING PATH" on the pop-up screen, and depresses an "ADDITION" button, and thereby, analysis device 200 adds a column for the selected machining path, in the field of "MACHINING CONDITION INPUT".

In the field of "MACHINING CONDITION INPUT", a button for "READ" and a button for "SAVE" are provided. Thereby, by depressing the button for "SAVE", the user can store the input information about the machining condition, in storage device 213. For example, the user stores the input information about the machining condition, in storage device 213, such that the condition set name is "CONDITION A". Further, in the case where the stored information about the machining condition is read, the user depresses the button for "READ", and thereby can read the information about the machining condition that is stored in storage device 213, in the field of "MACHINING CONDITION INPUT".

[Function Effect]

In analysis device 200, processor 211 performs the data processing to the measurement result, and displays the first image that displays the measurement result in time-series and the second image that displays the computation result corresponding to the measurement result for the specific time period in the first image, on the display screen of display 214. Thereby, the computation result after processor 211 performs the data processing for the specific time period to which the user pays attention can be displayed so as to directly correspond to the measurement result, and therefore, the information allowing the state of cutting tool 100 to be more accurately determined can be provided to the user.

In analysis device 200, processor 211 displays the first image that displays the measurement result in time-series and the second image that displays the computation result after the data processing, as an identical display screen, on display 214. Thereby, without the switching of the image that is displayed, the computation result after the data processing is performed for the specific time period directly corresponds to the measurement result, causing a display that makes it easy for the user to overview the information.

Analysis device 200 further includes input interface 215 that accepts the user's operation, and when input interface 215 accepts the specific time period altered by the user's operation, processor 211 displays, as the second image, the computation result corresponding to the measurement result for the altered specific time period, on display 214. Thereby, the user oneself can alter the specific time period to which the user would like to pay attention, and can display the computation result corresponding to the measurement result for the altered specific time period, on the display screen of display 214, by the selection from the measurement result displayed in time-series.

In analysis device 200, the input interface 215 accepts, as the specific time period, the time point and time period that are specified on the first image by the user's operation. Thereby, it is possible to freely select the specific time period to which the user wants to pay attention, from the measurement result displayed in time-series.

In analysis device 200, the acquired measurement result includes the tool information about the machining tool, and processor 211 alters the kinds of the measurement result and the computation result that are displayed on the display screen based on the acquired tool information. Thereby, it is possible to appropriately alter the information that is displayed on the display screen, depending on the kind of cutting tool 100.

In analysis device 200, processor 211 performs the data processing of associating a plurality of acquired measurement results, and displays computation results associated with the plurality of measurement results, in the second image. Thereby, the information allowing the state of cutting tool 100 to be more accurately determined can be provided to the user.

In analysis device 200, processor 211 displays the computation results associated with the plurality of measurement results, in the second image, while showing the computation results in the spatial coordinate system. Thereby, the information allowing the state of cutting tool 100 to be more accurately determined can be provided to the user.

In analysis device 200, when measurement result 233 is stored in storage device 213, the information about the machining condition is added and is stored as one file, and when the machining condition is selected and a plurality of files is acquired from storage device 213, processor 211 arrays and displays the first image and the second image on the display screen, for each machining condition. Thereby, it is possible to array and display measurement results and computation results under the same machining condition, such that the user easily performs the comparison, and the information allowing the state of cutting tool 100 to be more accurately determined can be provided to the user.

[Modification]

In the embodiment, it has described that the first image that displays the measurement result shown in FIG. 6 in time-series and the second image that displays the computation result after the data processing are displayed on the same display screen, but the first image and the second image may be displayed on separate display screens, and the display screen may be switched by a user's operation or at an interval of a fixed time period, for example.

It has been described that the information about the machining condition is added to the measurement values of the sensors in measurement result 233 shown in FIG. 5 and is stored in storage device 213 as one file. However, without being limited to this, only the measurement values of the sensors are stored in the measurement result, and the information about the machining condition may be stored in another file. However, the information about the machining condition stored in the other file and the measurement result in which only the measurement values of the sensors are stored are associated by link information or the like.

In the embodiment, it has been described that analysis device 200 performs the data processing to the measurement result stored in storage device 213, but the data processing may be performed to a measurement result during machining.

It should be understood that the embodiments and example disclosed herein are examples and are not limitative in all respects. It is intended that the scope of the present disclosure is shown not by the above embodiments but by the claims and includes all alterations within a meaning and range equivalent to the claims.

REFERENCE SIGNS LIST

1 Machining system; 2 Machining tool analysis system; 50 Tool rest; 100 Cutting tool; 110 Cutting insert; 111 Shank; 113A, 113B Fixing member; 120 Sensor module; 121 Acceleration sensor; 122 Strain sensor; 123 Processor unit; 124 Communication unit; 125 Storage; 129 Battery; 200 Analysis device; 201 Wireless device; 211 Processor; 212 Communication device; 213 Storage device; 214 Display; 215 Input interface; 216 Media reading device; 220 Recording medium; 231 Analysis program; 232 Mechanical machining condition; 233 Measurement result; 300 Machine tool; 301 Machining control device

The invention claimed is:

1. An analysis device that analyzes a state of a machining tool, the analysis device comprising:

a first interface configured to acquire a measurement result from at least one sensor fitted to the machining tool; and processing circuitry configured to perform data processing to the measurement result acquired by the first interface;

display a first image and a second image on a display screen, the first image displaying the measurement result acquired by the first interface in time-series, the second image displaying a computation result after the data processing is performed; and display, as the second image, the computation result corresponding to the measurement result for a specific time period in the first image.

2. The analysis device according to claim 1, wherein the processing circuitry is configured to display the first image and the second image on an identical display screen.

3. The analysis device according to claim 1, further comprising a second interface configured to accept a user's operation, wherein when the second interface accepts the specific time period altered by the user's operation, the processing circuitry is configured to display, as the second image, the computation result corresponding to the measurement result for the altered specific time period.

4. The analysis device according to claim 3, wherein the second interface is configured to accept, as the specific time period, a time point and a time period that are specified on the first image by the user's operation.

5. The analysis device according to claim 1, wherein the measurement result acquired by the first interface includes tool information about the machining tool, and the processing circuitry is configured to alter kinds of the measurement result and the computation result that are displayed on the display screen based on the tool information acquired by the first interface.

6. The analysis device according to claim 1, wherein, when the first interface acquires the measurement result from a plurality of sensors, the processing circuitry is configured to:

perform data processing of associating a plurality of measurement results acquired by the first interface, and display computation results associated with the plurality of measurement results in the second image.

7. The analysis device according to claim 6, wherein the processing circuitry is configured to display the computation results associated with the plurality of measurement results, in the second image, while showing the computation results in a spatial coordinate system.

8. The analysis device according to claim 1, further comprising a storage that stores the measurement result, wherein when the measurement result is stored in the storage, information about a machining condition is added and is stored as one file, and when the first interface acquires a plurality of files from the storage by selecting the machining condition, the processing circuitry is configured to array and display the first image and the second image on the display screen for each machining condition.

9. A machining system comprising:

a machine tool that performs machining using a machining tool that includes at least one sensor; and an analysis device that analyzes a state of the machining tool that is used in the machine tool, the analysis device comprising:

an interface configured to acquire a measurement result from the sensor; and processing circuitry configured to:

perform data processing to the measurement result acquired by the interface;

display a first image and a second image on a display screen, the first image displaying the measurement result acquired by the interface in time-series, the second image displaying a computation result after the data processing is performed; and display, as the second image, the computation result corresponding to the measurement result for a specific time period in the first image.

10. An analysis method for analyzing a state of a machining tool, the analysis method comprising:

acquiring a measurement result from at least one sensor fitted to the machining tool;

performing data processing to the acquired measurement result;

displaying, as a first image, the acquired measurement result in time-series; and displaying, as a second image, a computation result after the data processing is performed to the measurement result for a specific time period specified in the first image.

11. The analysis method according to claim 10, further comprising displaying the first image and the second image on an identical display screen.

12. The analysis method according to claim 10, further comprising:

accepting a user's operation; and when the specific time period is altered by the user's operation, displaying, as the second image, the computation result corresponding to the measurement result for the altered specific time period.

13. The analysis method according to claim 12, further comprising accepting, as the specific time period, a time point and a time period that are specified on the first image by the user's operation.

14. The analysis method according to claim 10, wherein the acquired measurement result includes tool information about the machining tool, and the method further includes altering kinds of the measurement result and the computation result that are displayed based on the tool information.

15. The analysis method according to claim 10, further comprising, when acquiring the measurement result from a plurality of sensors:

performing data processing of associating a plurality of measurement results, and displaying computation results associated with the plurality of measurement results in the second image.

16. The analysis method according to claim 15, further comprising displaying the computation results associated with the plurality of measurement results, in the second image, while showing the computation results in a spatial coordinate system.

17. The analysis method according to claim 10, further comprising:

when the measurement result is stored in a storage, adding and storing information about a machining condition as one file, and when a plurality of files is acquired from the storage by selecting the machining condition, arraying and displaying the first image and the second image on a display screen for each machining condition.

18. A non-transitory computer readable medium storing a program which when executed by an analysis device that analyzes a state of a machining tool causes the analysis device to perform a method, the method comprising:

acquiring a measurement result from at least one sensor fitted to the machining tool;

performing data processing to the acquired measurement result;

displaying, as a first image, the acquired measurement result in time-series; and displaying, as a second image, a computation result after the data processing is performed to the measurement result for a specific time period specified in the first image.

* * * * *